(12) United States Patent  (10) Patent No.: US 9,203,603 B2
Kitajima et al.  (45) Date of Patent: Dec. 1, 2015

(54) COMMUNICATION SYSTEM, FRAME SYNCHRONIZATION DETECTION APPARATUS, AND FRAME SYNCHRONIZATION DETECTION METHOD

(71) Applicant: FUJITSU LIMITED, Kawasaki-shi, Kanagawa (JP)

(72) Inventors: Hiroyuki Kitajima, Kawasaki (JP); Hiroyuki Homma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 13/672,053

(22) Filed: Nov. 8, 2012

(65) Prior Publication Data

US 2013/0064555 A1  Mar. 14, 2013

Related U.S. Application Data

(63) Continuation of application No. PCT/JP2010/059254, filed on Jun. 1, 2010.

(51) Int. Cl.
*H04L 7/00* (2006.01)
*H04J 3/06* (2006.01)
*H04J 3/16* (2006.01)

(52) U.S. Cl.
CPC .............. *H04L 7/0075* (2013.01); *H04J 3/0608* (2013.01); *H04J 3/1652* (2013.01)

(58) Field of Classification Search
CPC ... H04L 69/166; H04L 29/06136; H04L 7/00; H04L 7/04; H04J 14/086; H04J 3/076; H04J 3/0602
USPC ........................................................... 370/474
See application file for complete search history.

(56) References Cited

U.S. PATENT DOCUMENTS

| 7,742,502 B2 * | 6/2010 | Vissers et al. ................. 370/473 |
| 2003/0048813 A1 | 3/2003 | Lahav et al. |
| 2006/0050827 A1 * | 3/2006 | Saeki et al. ................... 375/362 |
| 2009/0190510 A1 * | 7/2009 | Kobayashi ..................... 370/280 |

(Continued)

FOREIGN PATENT DOCUMENTS

| EP | 1657839 | 5/2006 |
| EP | 1826926 | 8/2007 |

(Continued)

OTHER PUBLICATIONS

International Search Report of Corresponding PCT Application PCT/JP2010/059254 mailed Aug. 24, 2010.

(Continued)

*Primary Examiner* — Edan Orgad
*Assistant Examiner* — Vanneilian Lalchinthang
(74) *Attorney, Agent, or Firm* — Staas & Halsey LLP

(57) ABSTRACT

A frame transmitting unit divides a payload area of an upper-layer frame into a plurality of slots, maps a lower-layer frame to one or more of the slots, and transmits the upper-layer frame including connection information that indicates which one or more of the slots the lower-layer frame of a same type is mapped to. The frame synchronization detection unit identifies, as one or more allocated slots, the one or more slots to which the lower-layer frame of the same type is mapped, on the basis of the connection information, and detects the frame synchronization by identifying a frame head signal of the lower-layer frame of the same type that is mapped to the one or more allocated slots.

3 Claims, 25 Drawing Sheets

(56) References Cited

U.S. PATENT DOCUMENTS

2010/0074386 A1* 3/2010 Sakamoto et al. ............ 375/371
2010/0158519 A1* 6/2010 Dong et al. .................... 398/45

FOREIGN PATENT DOCUMENTS

| | | |
|---|---|---|
| JP | 5-344114 | 12/1993 |
| JP | 8-265285 | 10/1996 |
| JP | 2008-92130 | 4/2008 |
| JP | 2008-278137 | 11/2008 |
| JP | 2010-114691 | 5/2010 |
| WO | WO 2008/035769 A1 | 3/2008 |
| WO | WO 2008/149407 A1 | 12/2008 |

OTHER PUBLICATIONS

Patent Abstracts of Japan, Publication No. 2010-114691, Published May 20, 2010.
Patent Abstracts of Japan, Publication No. 2008-278137, Published Nov. 13, 2008.
Patent Abstracts of Japan, Publication No. 08-265285, Published Oct. 11, 1996.
Patent Abstracts of Japan, Publication No. 05-344114, Published Dec. 24, 1993.
Japanese Office Action issued Jun. 18, 2013 in corresponding Japanese Patent Application No. 2012-518170.
Patent Abstract of Japan, Publication No. 2008-92130, Published Apr. 17, 2008.

* cited by examiner

| | | | |
|---|---|---|---|
| TS#4 | 1 | 9 | 5 |
| TS#7 | 2 | 10 | 17 |
| TS#10 | 3 | 11 | 18 |
| TS#13 | 4 | 12 | 19 |
| TS#16 | 5 | 13 | 20 |
| TS#19 | 6 | 14 | 21 |
| TS#22 | 7 | 15 | 22 |
| TS#25 | 8 | 16 | 23 |

FIG. 14

| TS NO. | LOGICAL PORT NO. |
|---|---|
| 0 | 0 |
| 1 | 0 |
| 2 | 1 |
| 3 | 2 |
| 4 | 2 |
| 5 | 1 |
| 6 | 2 |
| ........ | |
| 79 | 2 |
| 80 | 2 |

FIG. 16
LO—ODU0
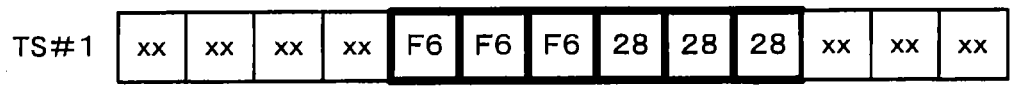
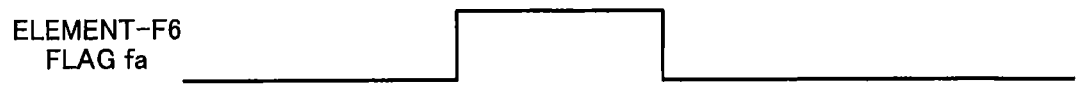

COMMUNICATION SYSTEM, FRAME SYNCHRONIZATION DETECTION APPARATUS, AND FRAME SYNCHRONIZATION DETECTION METHOD

CROSS-REFERENCE TO RELATED APPLICATION

This application is a continuation application of International Application PCT/JP2010/059254 filed on Jun. 1, 2010, and designated the U.S., the entire contents of which are incorporated herein by reference.

FIELD

The embodiments discussed herein are related to a communication system that performs information communication, a frame synchronization detection apparatus that detects frame synchronization, and a frame synchronization detection method.

BACKGROUND

The OTN (Optical Transport Network) is one of the transmission technologies that support the backbone network for optical communications, and has been standardized by the ITU-T (International Telecommunication Union Telecommunication Standardization Sector).

The OTN is a technology for generating frames of a layered structure in which client signals such as SONET/SDH (Synchronous Optical Network/Synchronous Digital Hierarchy) and Ethernet™ are accommodated, and performing data transmission appropriate for WDM (Wavelength Division Multiplexing).

In recent years, there is a growing discussion on OTN extension as to how to accommodate various client signals while maintaining connectivity with the existing layered structures and how to achieve efficient data transmission.

As one example of OTN extension, a client accommodating system using LO-ODU (Lower Order Optical Channel Data Unit) and HO-ODU (Higher Order Optical Channel Data Unit) is drawing attention.

According to this system, in addition to data signals such as SONET/SDH and Ethernet, signals having a frame structure are also accommodated in a multiplexed form as client signal so as to increase the flexibility in accommodation of client signals.

The frame accommodated as a client signal is called an LO-ODU, and the frame in which the LO-ODU is stored is called an HO-ODU. The LO-ODU is mapped to a payload area of the HO-ODU so as to be transmitted. The receiving end detects frame synchronization of the LO-ODU so as to perform monitoring.

As one of related art techniques for frame synchronization, a method that performs frame synchronization for each STM-1 (Synchronous Transport Module-1) in STM-N has been disclosed (see, for example, Japanese Laid-open Patent Publication No. 08-265285). There has also been disclosed a technique that reduces the time taken to detect a fixed pattern for frame synchronization (see, for example, Japanese Laid-open Patent publication No. 2008-278137).

There are a plurality of types of LO-ODUs to be accommodated in the HO-ODU, in accordance with the transmission rate. Upon mapping the plurality of types of LO-ODUs to the HO-ODU, the LO-ODUs are discretely mapped to a payload area of the single HO-ODU. Further, upon monitoring the LO-ODUs at the receiving end, frame synchronization of the LO-ODUs is established.

For establishing frame synchronization, a selector circuit may be provided for each type of LO-ODU so as to sort LO-ODUs by type, and then synchronization detection control may be performed on the sorted LO-ODUs.

According to this circuit configuration, however, a plurality of parallel control systems for detecting frame synchronization on a per LO-ODU type basis need to be provided. Therefore, the same number of control systems as the possible maximum number of LO-ODU types are provided in advance, resulting in increased apparatus size (circuit size) and increased implementation difficulty.

SUMMARY

According to one aspect of the invention, there is provided a communication system that includes a frame transmitting apparatus that includes: a frame transmitting unit configured to divide a payload area of an upper-layer frame into a plurality of slots, map a lower-layer frame to one or more of the slots, and transmit the upper-layer frame with connection information included, the connection information indicating which one or more of the slots the lower-layer frame of a same type is mapped to; and a frame receiving apparatus that includes: a frame receiving unit configured to receive the upper-layer frame; and a frame synchronization detection unit configured to detect frame synchronization of the lower-layer frame; wherein the frame synchronization detection unit identifies, as one or more allocated slots, the one or more slots to which the lower-layer frame of the same type is mapped, on the basis of the connection information, and detects the frame synchronization by identifying a frame head signal of the lower-layer frame of the same type that is mapped to the one or more allocated slots.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a mapped state of LO-ODU0;
FIG. 11 illustrates the order of mapping;
FIG. 14 illustrates connection information;
FIG. 16 illustrates an exemplary generation pattern of FAS element flags.

DESCRIPTION OF EMBODIMENTS

Figure 1:
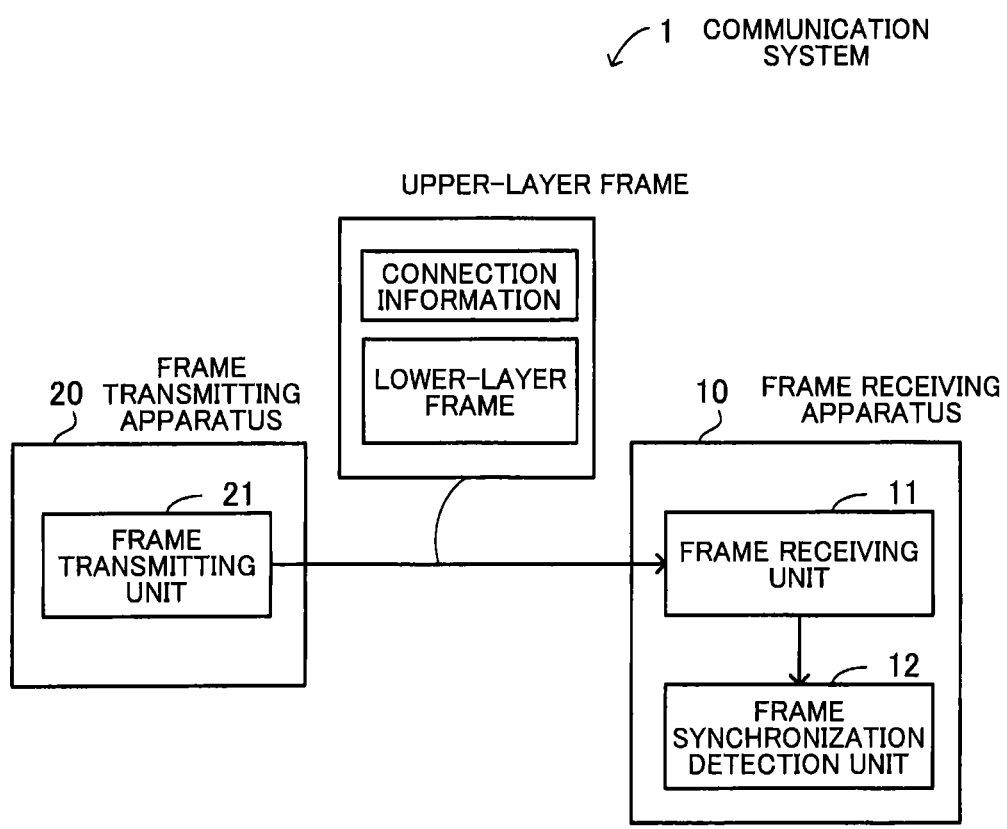
FIG. 1 illustrates an exemplary configuration of a communication system.

Several embodiments will be described below with reference to the accompanying drawings, wherein like reference numerals refer to like elements throughout. FIG. 1 illustrates an exemplary configuration of a communication system 1. The communication system includes a frame transmitting apparatus 20 and a frame receiving apparatus 10.

The frame transmitting apparatus 20 includes a frame transmitting unit 21. The frame transmitting unit 21 divides a payload area of an upper-layer frame into a plurality of slots, and maps a lower-layer frame to one or more of the divided slots.

Further, the frame transmitting unit 21 generates connection information indicating which one or more of the slots the lower-layer frame of the same type is mapped to. Then, the frame transmitting unit 21 transmits the upper-layer frame with the connection information included in the overhead thereof.

The frame receiving apparatus 10 includes a frame receiving unit 11 and a frame synchronization detection unit 12. The frame receiving unit 11 receives the upper-layer frame. The frame synchronization detection unit 12 detects frame synchronization of the lower-layer frame mapped to the upper-layer frame.

The frame synchronization detection unit 12 identifies, as one or more allocated slots, the one or more slots to which the lower-layer frame of the same type mapped, on the basis of the connection information. Then, the frame synchronization detection unit 12 identifies a frame head signal of the lower-layer frame of the same type that is mapped to the one or more allocated slots, and thereby detects frame synchronization.

In this case, the frame synchronization detection unit 12 detects all the frame head signal elements of the frame head signal of the lower-layer frame mapped to the one or more slots, and generates flags for all the frame head signal elements.

After that, the frame synchronization detection unit 12 aggregates flags of the frame head signal elements mapped to the one or more allocated slots so as to identify the frame head signal of the lower-layer frame of the same type, and thereby detects frame synchronization of the lower-layer frame. The details of the operation will be described below with specific examples.

Next, a description will be given of a case in which the communication system 1 is applied to a system of the OTN. The frame structure of the OTN will be described first.

Figure 2:
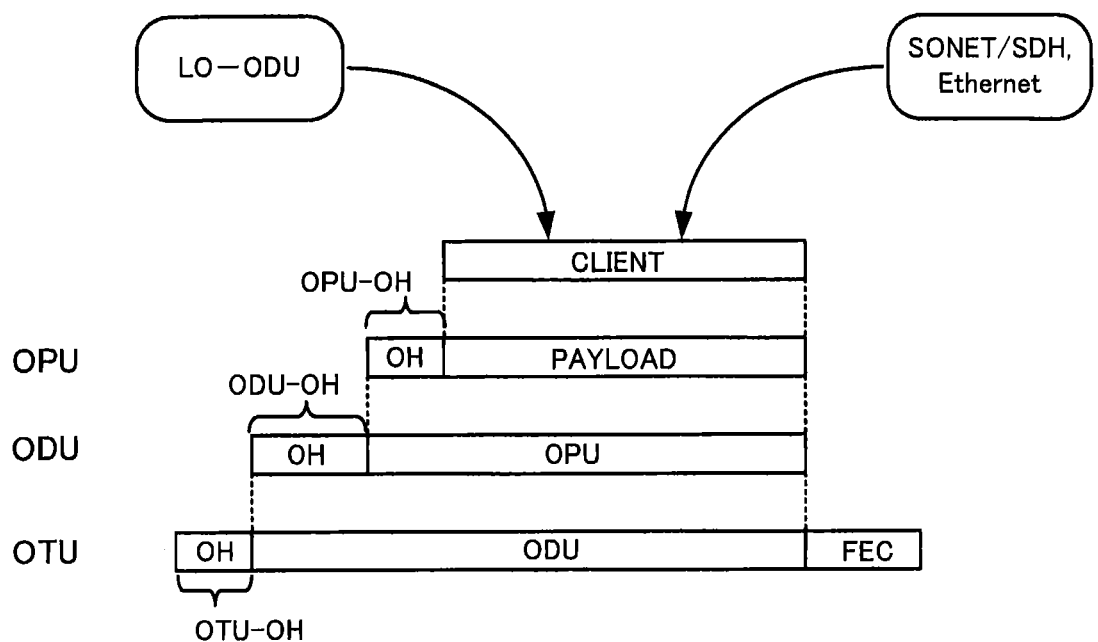
FIG. 2 illustrates an exemplary layered structure of frames of the OTN.

FIG. 2 illustrates an exemplary layered structure of frames of the OTN. Frames of the OTN form a layered structure, including an OPU (Optical Channel Payload Unit) frame, an ODU (Optical Channel Data Unit) frame, and an OTU (Optical Channel Transport Unit) frame in this order from the top layer to the bottom layer.

The OPU frame is generated by accommodating client signals such as SONET\SDH and Ethernet in a payload, and adding an overhead (OH) as control information to the payload. Then, the ODU frame is generated by adding an overhead to the OPU frame. Then, the OTU frame is generated by adding an overhead and a FEC (Forward Error Correction) code to the ODU frame.

The overhead of the OPU frame is referred to as an OPU-OH; the overhead of the ODU frame is referred to as an ODU-OH; and the overhead of the OTU frame is referred to as an OTU-OH. The client signals to be accommodated in the payload may include LO-ODU frames, other than data signals such as SONET/SDH and Ethernet.

Figure 3:
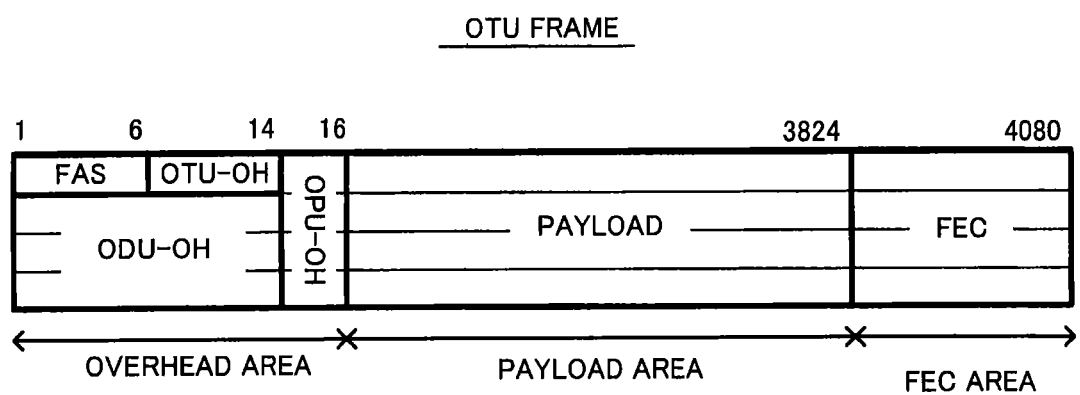
FIG. 3 illustrates a format of an OTU frame.

FIG. 3 illustrates a format of an OTU frame. The OTU frame includes an overhead area, a payload area, and a FEC area.

The overhead area has a frame size of 16 bytes (columns 1-16) by 4 rows; the payload area has a frame size of 3,808 bytes (columns 17-3824) by 4 rows; and the FEC area has a frame size of 256 bytes (columns 3825-4080) by 4 rows.

The overhead area includes an OPU-OH as an overhead of an OPU frame, an ODU-OH as an overhead of an ODU frame, and an OTU-OH as an overhead of an OTU frame. The overhead area further includes a FAS (Frame Alignment Signal) that serves as a frame head signal indicating the head of the frame.

The FAS is located in columns 1-6 of row 1. The OTU-OH is located in columns 7-14 of row 1, and the ODU-OH is located in columns 1-14 of rows 2-4. Further, the OPU-OH is located in columns 15-16 of rows 1-4.

Figure 4:
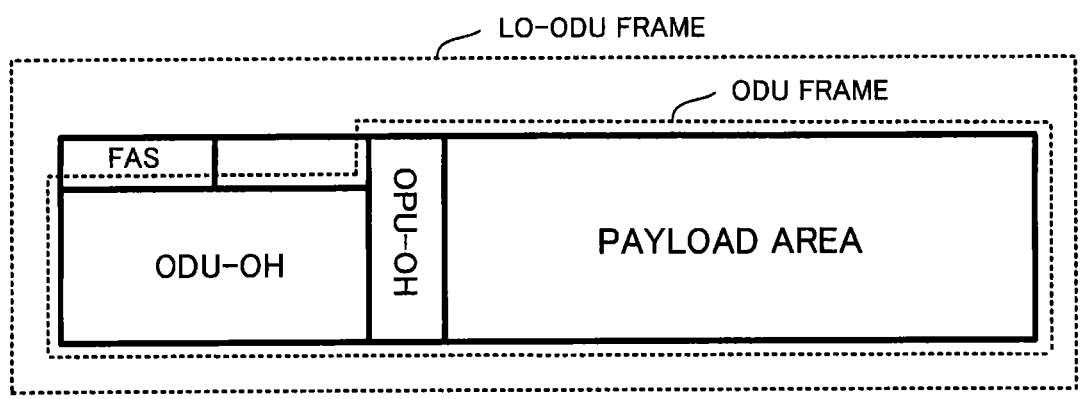
FIG. 4 illustrates a format of an LO-ODU frame.

FIG. 4 illustrates a format of an LO-ODU frame. An LO-ODU frame has a format that includes an ODU frame with a FAS added thereto. The overhead area includes a FAS, an ODU-OH, and an OPU-OH.

It is to be noted that the HO-ODU to which the LO-ODU is mapped has the same frame format as that of the ODU (an overhead area of the HO-ODU includes an ODU-OH and an OPU-OH).

Next, a description will be given of a method of mapping an LO-ODU to an HO-ODU. For performing mapping, the payload area of an HO-ODU is divided into a plurality of slots, and LO-ODUs are mapped to the divided slots corresponding to the bandwidth that the LO-ODUs need. The divided slots are hereinafter referred to as tributary slots (TSs). It is to be noted that the HO-ODU corresponds to an upper-layer frame, and the LO-ODU corresponds to a lower-layer frame.

Figure 5:
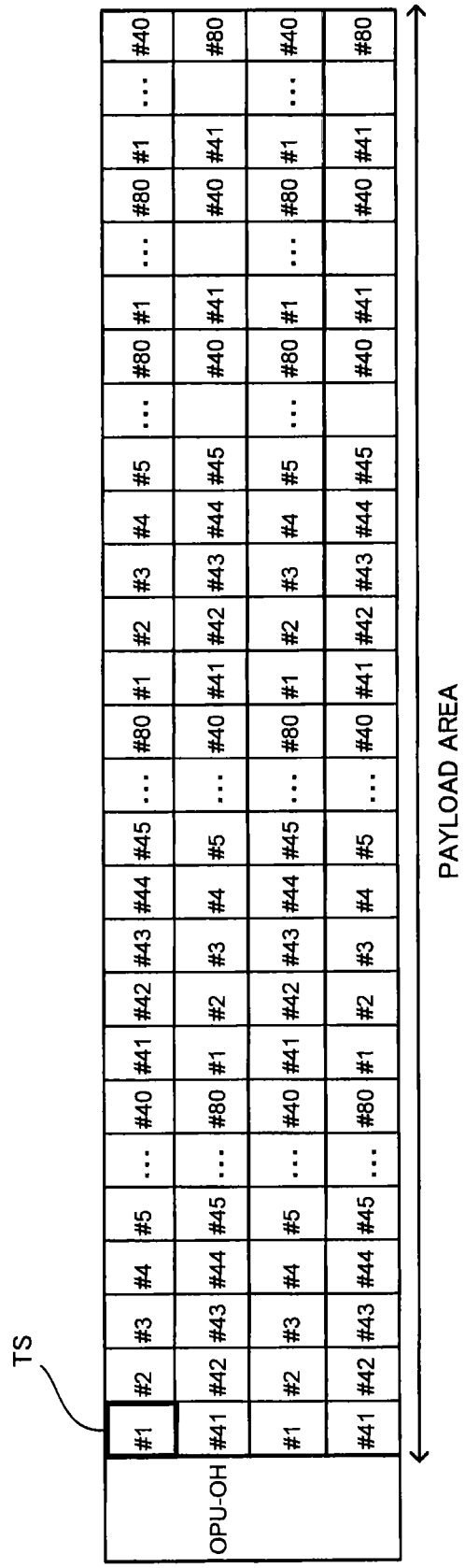
FIG. 5 illustrates a payload division of an HO-ODU.

FIG. 5 illustrates a payload division of an HO-ODU. A structure of payload division in HO-ODU4 is illustrated as an example. In HO-ODU4, the payload area is divided into units of 80 tributary slots, and each tributary slot has a bandwidth corresponding to approximately 1.25 Gb/s. Then, an LO-ODU is mapped to a unit of 80 tributary slots. In FIG. 5, 80 tributary slots of each unit are numbered with #1 through #80 from left to right.

Since each tributary slot has a bandwidth corresponding to approximately 1.25 Gb/s, in the case of LO-ODU0 having a transmission rate of approximately 1.25 Gb/s, LO-ODU0 is mapped to one of the 80 tributary slots.

Further, in the case of LO-ODU1 having a transmission rate of approximately 2.5 Gb/s, LO-ODU1 is mapped to two of the 80 tributary slots. In the case of LO-ODU2 having a transmission rate of approximately 10 Gb/s, LO-ODU2 is mapped to eight of the 80 tributary slots. In the case of LO-ODU3 having a transmission rate of approximately 40 Gb/s, LO-ODU3 is mapped to 32 of the 80 tributary slots.

Figure 6:
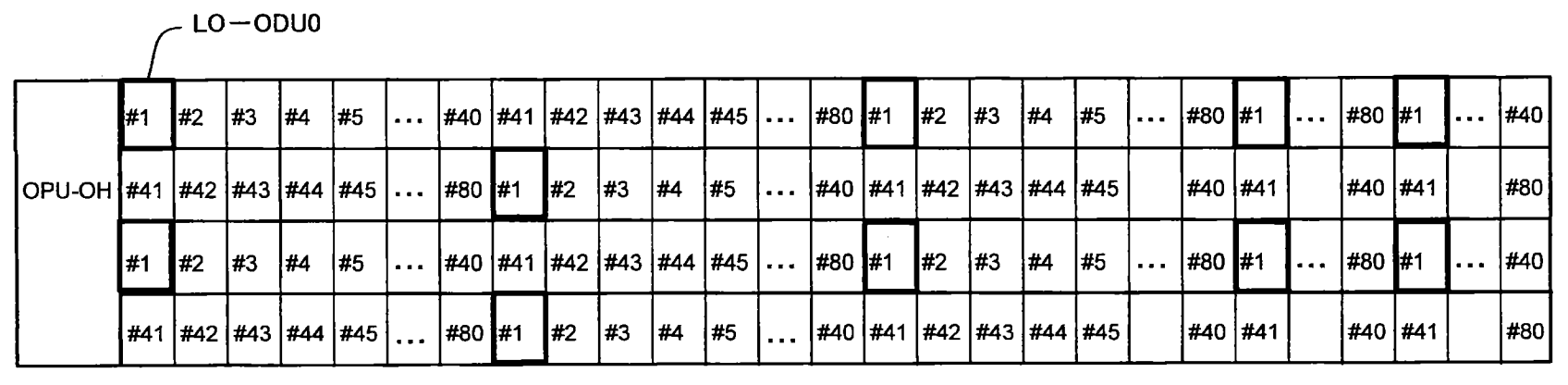
Figure 7:
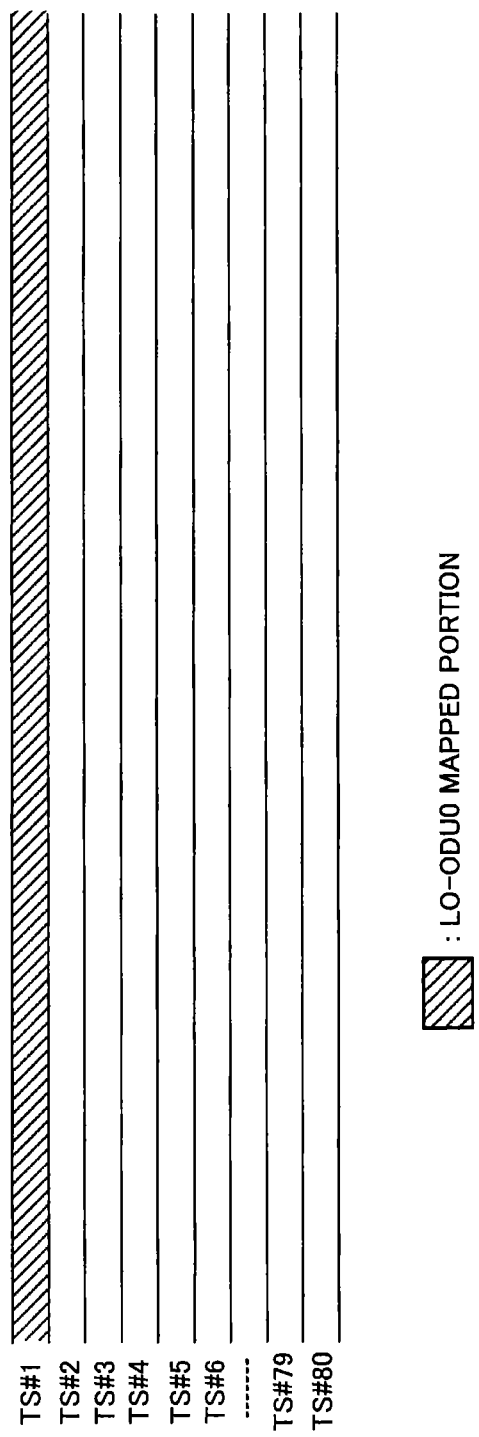
FIG. 7 illustrates a mapped state of LO-ODU0.

Next, a description will be given of mapping examples of LO-ODU0 and LO-ODU1 with reference to FIGS. 6 through 9. FIGS. 6 and 7 illustrate a mapped state of LO-ODU0. FIG. 6 illustrates LO-ODU0 mapped to the payload of HO-ODU4.

LO-ODU0 has a transmission rate of approximately 1.25 Gb/s, and therefore mapped to one tributary slot. In the example illustrated in FIG. 6, LO-ODU0 is mapped to the tributary slot #1 (the tributary slot #1 is the allocated slot). FIG. 7 illustrates the mapped state of LO-ODU0 in the case where the tributary slots #1 through #80 are vertically arranged.

Figure 8:
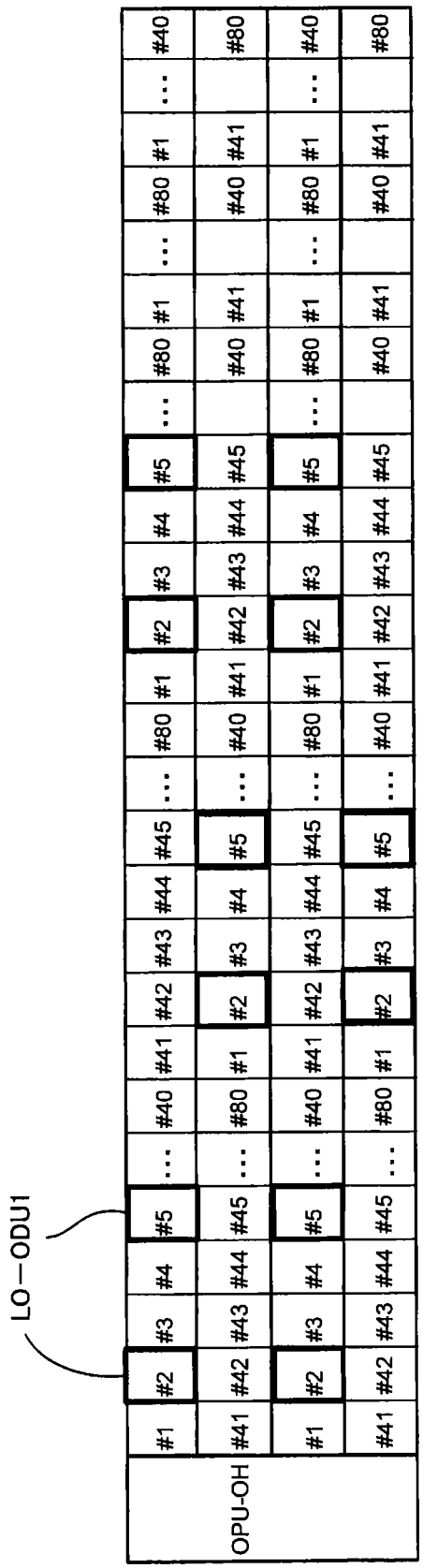
FIG. 8 illustrates a mapped state of LO-ODU1.
Figure 9:
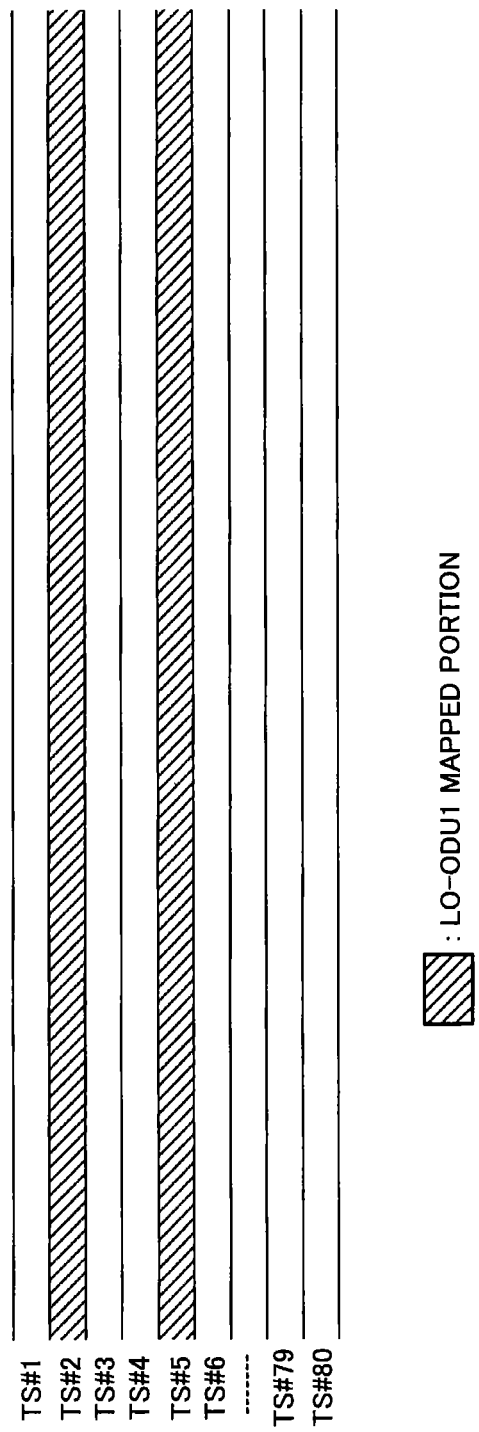
FIG. 9 illustrates a mapped state of LO-ODU1.

FIGS. 8 and 9 illustrate a mapped state of LO-ODU1. FIG. 8 illustrates LO-ODU1 mapped to the payload of HO-ODU4. LO-ODU1 has a transmission rate of approximately 2.5 Gb/s, and therefore is mapped to two tributary slots. In the example illustrated in FIG. 8, LO-ODU1 is mapped to the tributary slot #2 and #5 (the tributary slot #2 and #5 are the allocated slots). FIG. 9 illustrates the mapped state of LO-ODU1 in the case where the tributary slots #1 through #80 are vertically arranged.

In the case of mapping an LO-ODU to a plurality of slots, the LO-ODU does not need to be mapped to tributary slots that are adjacent to each other, and may be mapped to arbitrary tributary slots in the manner described above. LO-ODUk following LO-ODU3 are mapped in the same manner as described above.

Figure 10:
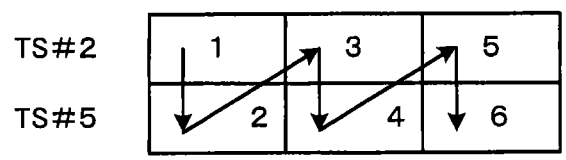
FIG. 10 illustrates the order of mapping.

Next, a description will be given of the order in which an LO-ODU is mapped to a plurality of tributary slots. FIGS. 10 and 11 illustrate the order of mapping. The numbers in FIGS. 10 and 11 indicate the order of mapping. FIG. 10 illustrates the mapping order in the case of LO-ODU1. In the case of mapping LO-ODU1 to two tributary slots, namely, the tributary slots #2 and #5, data are mapped in accordance with the flow indicated by the arrows in FIG. 10. That is, data are mapped across two tributary slots.

FIG. 11 illustrates the mapping order in the case of LO-ODU2. In the case of mapping LO-ODU2 to eight tributary slots, namely, the tributary slots #4, #7, #10, #13, #16, #19, #22, and #25, data are mapped in accordance with the flow indicated by the arrows in FIG. 11.

Figure 12:
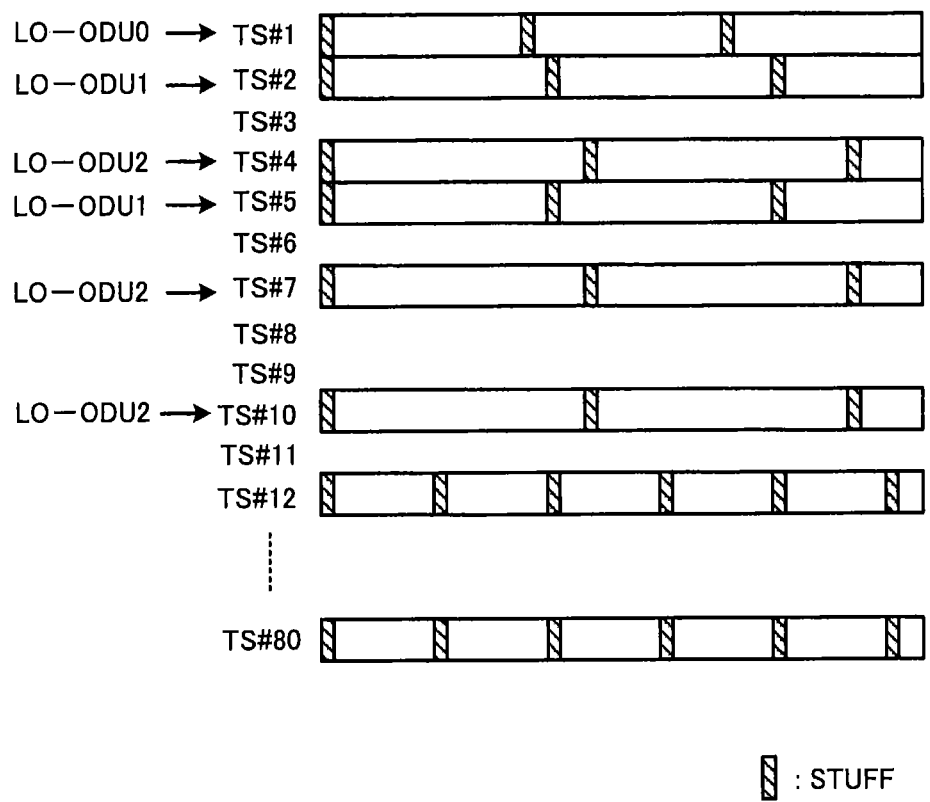
FIG. 12 illustrates a state in which stuff is inserted.

Next, a description will be given of stuffing. FIG. 12 illustrates a state in which stuff is inserted. In the case where there is a difference between the band reserved in the tributary slots of the HO-ODU and the band of the LO-ODUs, stuffing is performed by appropriately inserting stuff data of a fixed pattern such that the LO-ODUs are mapped discontinuously as illustrated in FIG. 12. In this way, the LO-ODUs are discretely and discontinuously arranged in the HO-ODU with stuff areas inserted therein.

Figure 13:
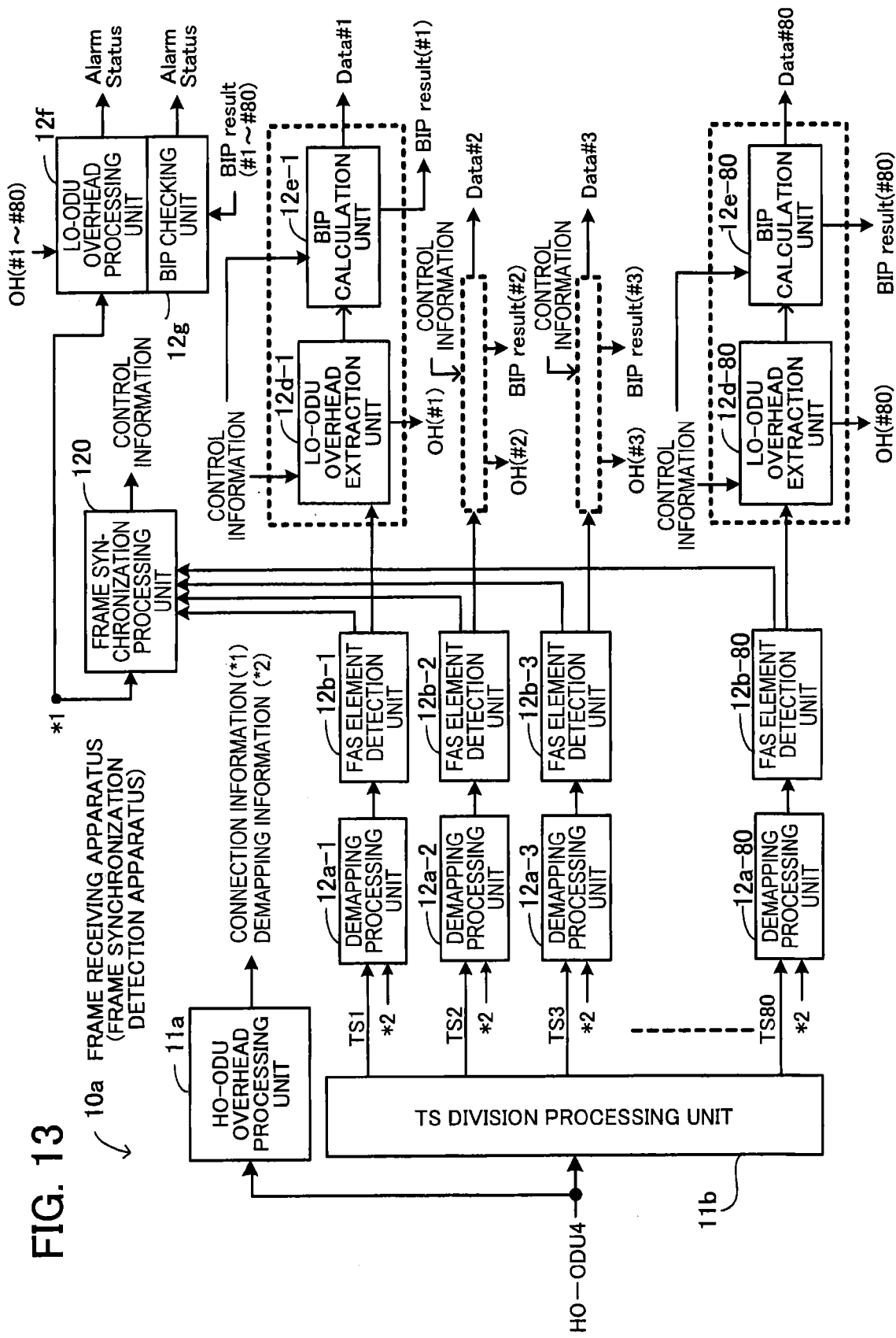
FIG. 13 illustrates an exemplary structure of a frame receiving apparatus.

Next, a description will be given of the structure of the frame receiving apparatus 10 (a frame synchronization detection apparatus). FIG. 13 illustrates an exemplary structure of a frame receiving apparatus 10a. The frame receiving apparatus 10a is configured to receive an HO-ODU4 frame and process 80 tributary slots.

The frame receiving apparatus 10a includes an HO-ODU overhead processing unit 11a, a TS (tributary slot) division processing unit lib, demapping processing units 12a-1 through 12a-80, FAS element detection units 12b-1 through 12b-80, a frame synchronization processing unit 120, LO-ODU overhead extraction units 12d-1 through 12d-80, BIP (Bit Interleaved Parity) calculation units 12e-1 through 12e-80, an LO-ODU overhead processing unit 12f, and a BIP checking unit 12g.

It is to be noted that the HO-ODU overhead processing unit 11a and the TS division processing unit 11b are included in the function of the frame receiving unit 11 of FIG. 1, and the other components are included in function of the frame synchronization detection unit 12.

The HO-ODU overhead processing unit 11a receives an HO-ODU4 frame and recognizes the overhead. Then, the HO-ODU overhead processing unit 11a recognizes and outputs demapping information indicating stuff position and connection information from the recognized overhead.

It is to be noted that the connection information indicates which of a plurality of divided tributary slots an LO-ODU is mapped to. Accordingly, in this example, the connection information indicates which of 80 tributary slots of LO-ODU4 an LO-ODU is mapped to by the frame transmitting end.

For example, if LO-ODU0 is mapped to the tributary slot #1, connection information regarding LO-ODU0 indicates the tributary slot #1. If LO-ODU1 is mapped to the tributary slots #2 and #5, the connection information regarding LO-ODU1 indicates the tributary slots #2 and #5 (the connection information will be described below in greater detail with reference to FIG. 14).

The TS division processing unit 11b receives the HO-ODU4 frame and recognizes the payload. Then, the TS division processing unit 11b divides a payload portion of the HO-ODU4 frame into units of tributary slots, and outputs data mapped to the tributary slots.

Each of the demapping processing units 12a-1 through 12a-80 identifies data portions and stuff portions in the corresponding tributary slot on the basis of the demapping information. Each of the FAS element detection units 12b-1 through 12b-80 detects FAS elements forming a FAS from a data stream of the corresponding tributary slot so as to generate FAS element flags.

The frame synchronization processing unit 120 operates a frame counter provided therein, on the basis of the connection information and the FAS element flags, so as to perform frame synchronization detection and frame recognition of the LO-ODU. Also, the frame synchronization processing unit 120 outputs control information including information on the position of the overhead of the LO-ODU frame and information of the BIP calculation range.

The LO-ODU overhead extraction units 12d-1 through 12d-80 extract an overhead of the LO-ODU from the respective tributary slots on the basis of the overhead position information included in the control information (i.e., extract an overhead from the data stream divided into the tributary slots). The BIP calculation units 12e-1 through 12e-80 perform BIP calculation for the respective tributary slots on the basis of the range information of BIP calculation, and output the calculation results (i.e., perform BIP calculation for the data stream divided into the tributary slots).

The LO-ODU overhead processing unit 12f aggregates the information on the overhead extracted by the LO-ODU overhead extraction units 12d-1 through 12d-80 so as to perform monitoring (i.e., so as to monitor system connection information, maintenance and management information and the like included in the overhead). Further, the LO-ODU overhead processing unit 12f outputs monitoring result information, which includes an alarm signal indicating failure information, a status signal indicating the operation status, and the like.

The BIP checking unit 12g aggregates the BIP calculation results output from the BIP calculation units 12e-1 through 12e-8 so as to obtain a BIP calculation value of the LO-ODU frame, and then performs BIP check. Further, the BIP checking unit 12g outputs communication quality information as the BIP calculation results. The communication quality information includes an alarm signal indicating a communication error state, a status signal indicating the communication quality level, and the like.

FIG. 14 illustrates the connection information. The determination as to which tributary slots form a group such that an LO-ODU is mapped thereto is made on the basis of connection information stored in the overhead of an HO-ODU.

The overhead including the connection information stores logical port numbers for the respective tributary slots. With this information, it is possible to determine which tributary slots are connected to each other. In the example of FIG. 14, only the tributary slots #2 and #5 have the same value "1", and therefore these two tributary slots are determined to be connected to each other.

Figure 15:
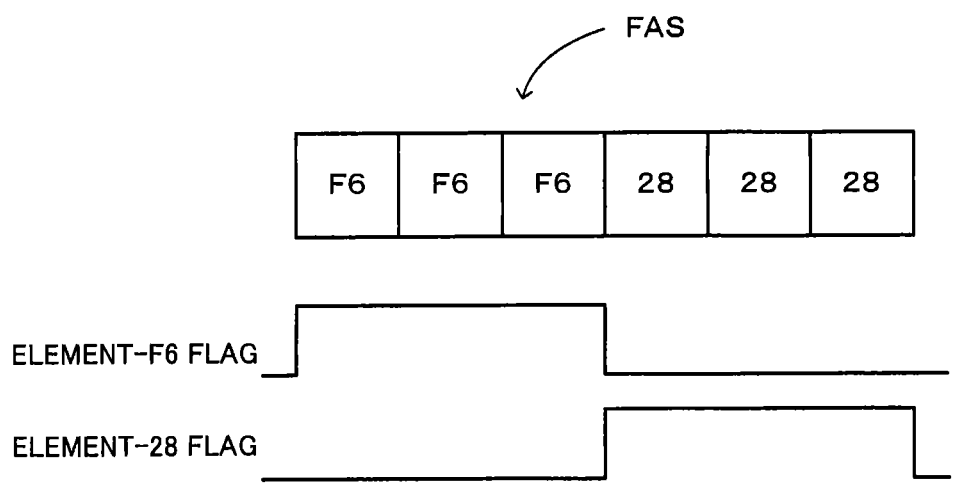
FIG. 15 illustrates FAS element flags.

Next, a description will be given of the FAS element flags output by the FAS element detection units 12*b*-1 through 12*b*-80. FIG. 15 illustrates the FAS element flags. For example, a FAS has a size of 48 bytes, and includes FAS elements of 0xF6 and 0x28 (hereinafter "0x" will be omitted). The FAS has a 48-byte pattern of F6, F6, F6, 28, 28 and 28. Further, since the FAS includes Elements F6 and Elements 28, the FAS element flags include an Element-F6 flag and an Element-28 flag.

FIG. 16 illustrates an exemplary generation pattern of FAS element flags. More specifically, FIG. 16 illustrates an exemplary generation pattern of FAS element flags in the case of LO-ODU0. In the case of LO-ODU0, since the data stream is mapped to a single tributary slot #1, the FAS elements are placed only in the tributary slots #1 in units of 1 byte (i.e., as F6, F6, F6, 28, 28, and 28). Accordingly, an Element-F6 flag fa is turned on at the portions of Elements F6, and an Element-28 flag fb is turned on at the portions of Elements 28.

Figure 17:
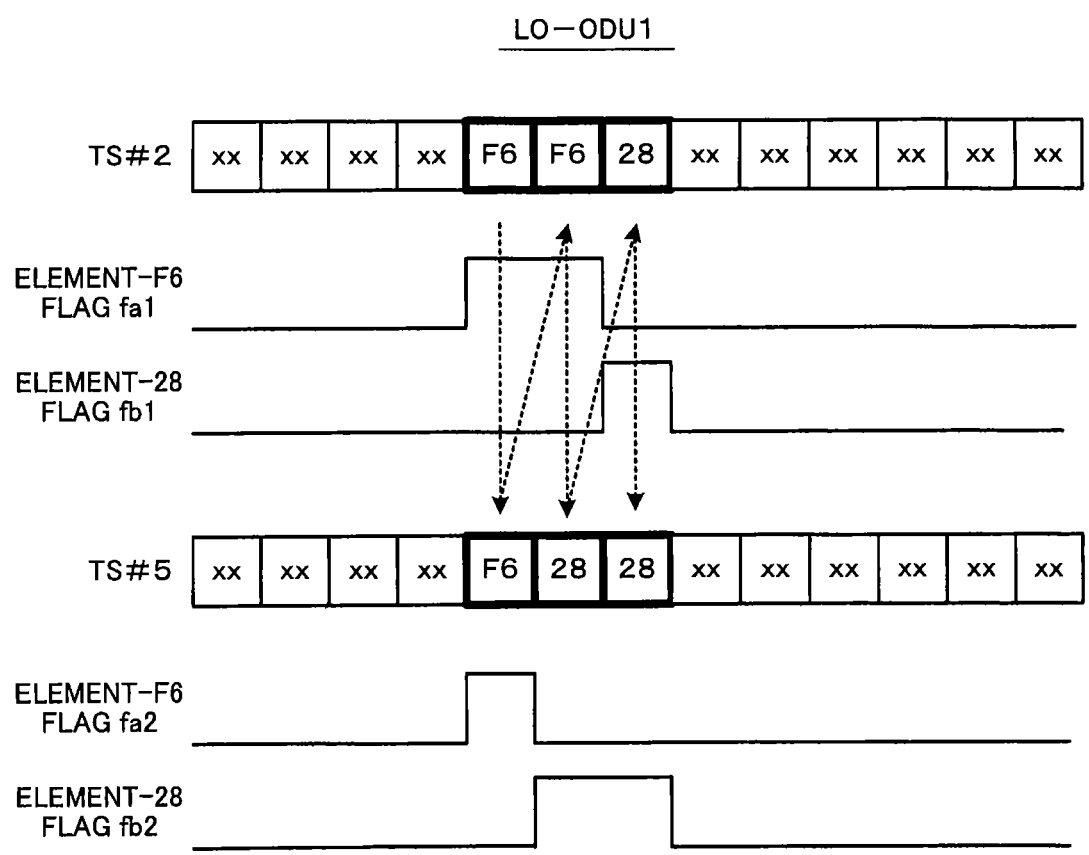
FIG. 17 illustrates another exemplary generation pattern of FAS element flags.

FIG. 17 illustrates another exemplary generation pattern of FAS element flags. More specifically, FIG. 17 illustrates an exemplary generation pattern of FAS element flags in the case of LO-ODU1. In the case of LO-ODU1, the data stream is mapped to two tributary slots #2 and #5.

Accordingly, as mentioned above with reference to FIG. 10, if the first Element F6 of the FAS elements is placed in the tributary slot #2, the second Element F6 of the FAS elements is placed in the tributary slot #5, and the third Element F6 of the FAS elements is placed in the tributary slot #2. Further, the first Element 28 of the FAS elements is placed in the tributary slot #5; the second Element 28 of the FAS elements is placed in the tributary slot #2, and the third Element 28 of the FAS elements is placed in the tributary slot #5. Accordingly, Element-F6 flags fa1 and fa2 are turned on at the portions of the corresponding Elements F6, and Element-28 flags fb1 and fb2 are turned on at the portions of the corresponding Elements 28.

Next, a description will be given of operations of the respective components in the case where a signal of LO-ODU1 is mapped to the tributary slots #2 and #5 of the HO-ODU4 frame.

The frame transmitting end maps the signal of LO-ODU1 to the tributary slots #2 and #5 of the HO-ODU4 frame so as to be transmitted. LO-ODU1 is mapped to HO-ODU4 in the manner as described above with reference to FIGS. 8 and 9.

Figure 18:
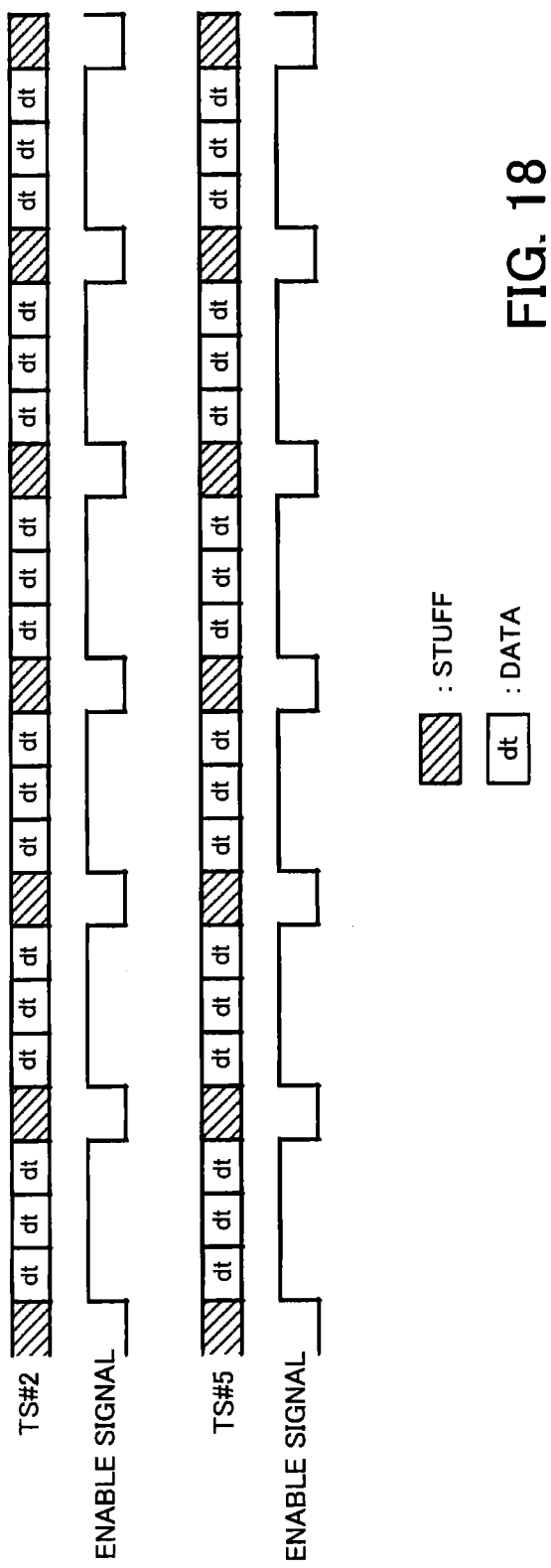
FIG. 18 illustrates operations of a demapping process.

FIG. 18 illustrates operations of a demapping process. LO-ODU1 is mapped while adjusting the rate by insertion of stuff. The demapping processing unit identifies data areas and stuff areas on the basis of the demapping information indicating the stuff positions. Then, the demapping processing unit generates an enable signal indicating that the data areas are effective portions (e.g., an enable signal that becomes H level at a data area, and becomes L level at a stuff area).

Figure 19:
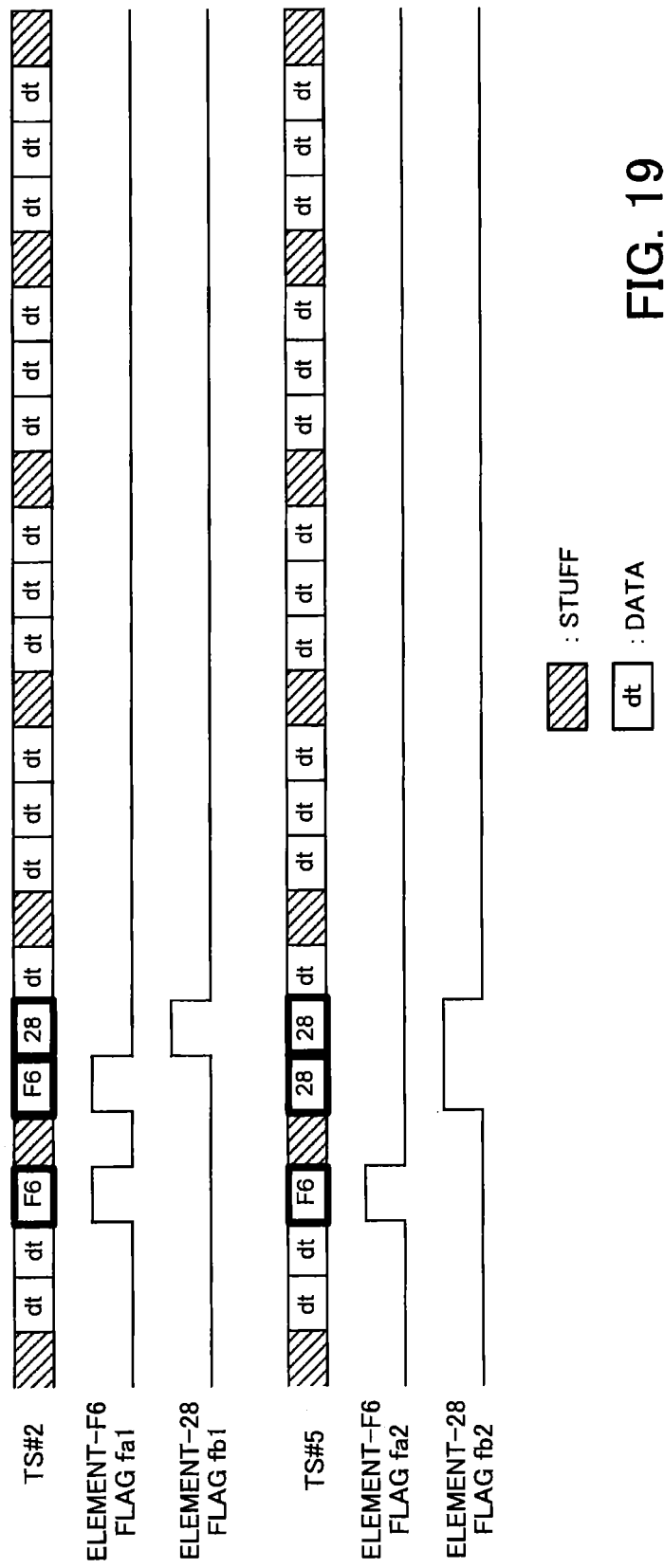
FIG. 19 illustrates operations of FAS element detection.

FIG. 19 illustrates operations of FAS element detection. The FAS element detection units detect FAS elements F6 and 28 from the respective data streams of the tributary slots #2 and #5 into which stuff is inserted, and generate FAS element flags. Since detection of FAS elements and generation of flags are performed in the way described above with reference to FIG. 17, and will not be further described herein.

Figure 20:
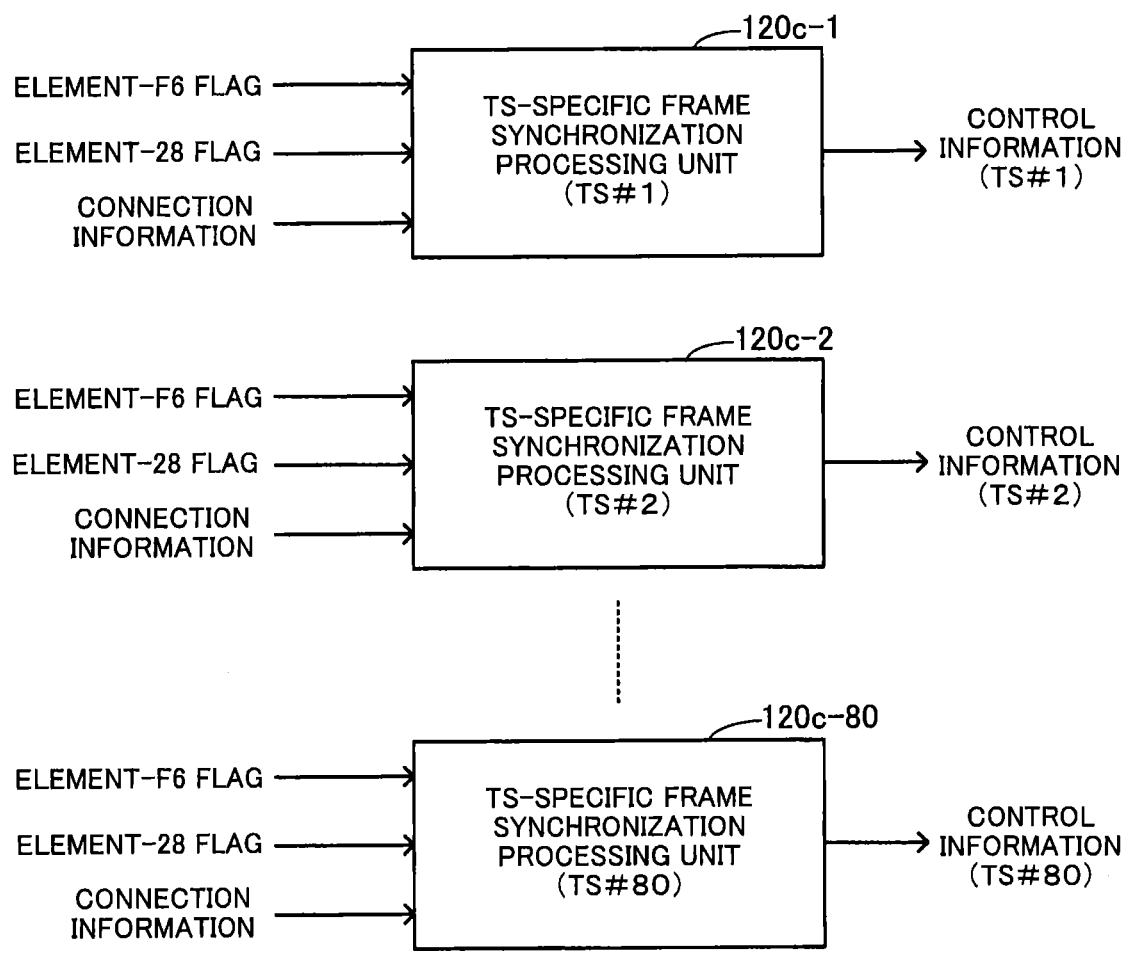
FIG. 20 illustrates the block configuration of a frame synchronization processing unit.

FIG. 20 illustrates the block configuration of the frame synchronization processing unit 120. The frame synchronization processing unit 120 includes TS-specific (tributary-slot-specific) synchronization processing units 120*c*-1 through 120*c*-80. Each of the TS-specific synchronization processing units 120*c*-1 through 120*c*-80 receives the FAS element flags (the Element-F6 flag and the Element-28 flag) and the connection information, and outputs control information (overhead position information and BIP calculation range information) by performing internal processing.

Figure 21:
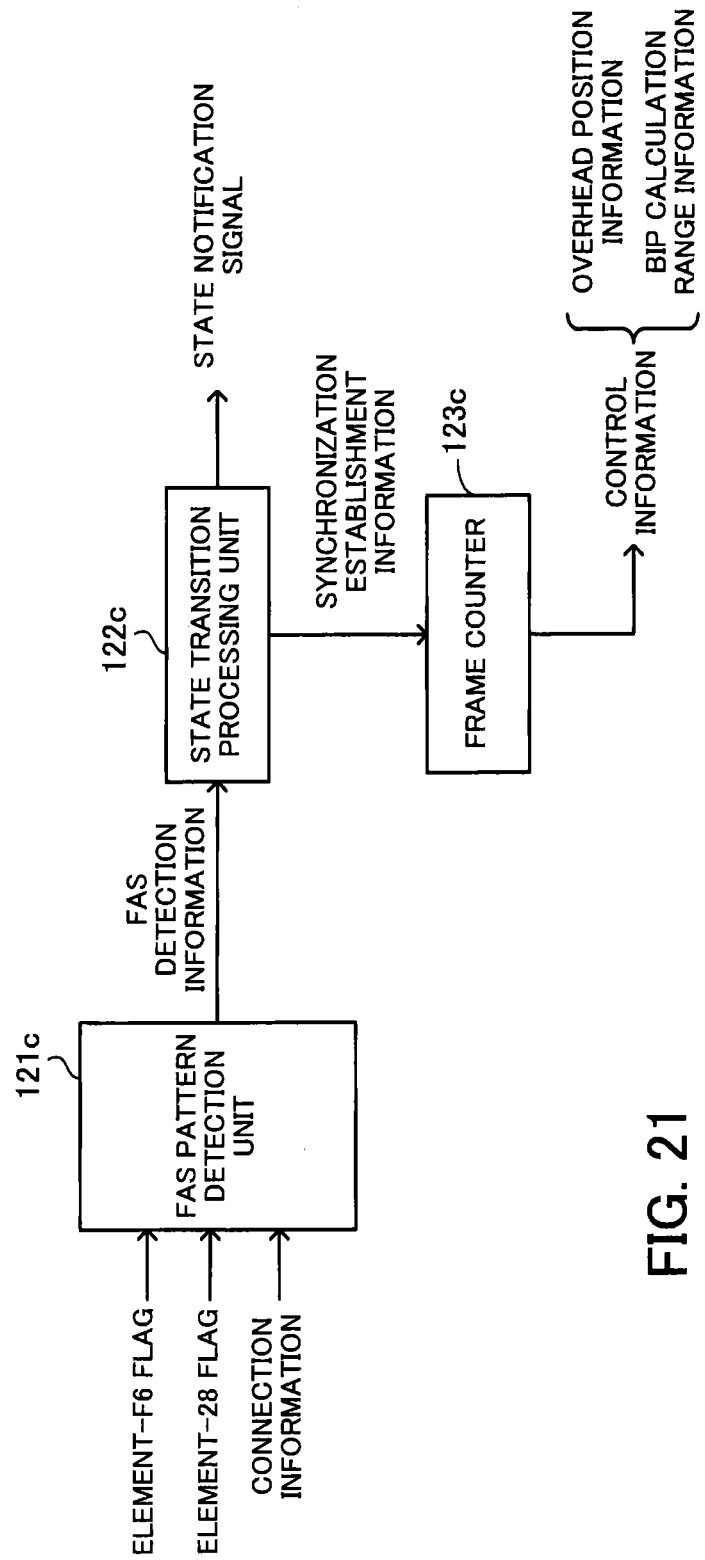
FIG. 21 illustrates the block configuration of a TS-specific frame synchronization processing unit.

FIG. 21 illustrates the block configuration of the TS-specific frame synchronization processing unit 120*c*. The TS-specific frame synchronization processing unit 120*c* includes a FAS pattern detection unit 121*c*, a state transition processing unit 122*c*, and a frame counter 123*c*.

The FAS pattern detection unit 121*c* detects an appearance pattern (F6F6F6282828) on the basis of the FAS element flags (Elements-F6 flags and Elements-28 flags) and the connection information, and outputs the FAS detection information.

The state transition processing unit 122*c* provides synchronization protection on the basis of the FAS detection information, and manages the state transition between a frame synchronization established state and a loss of synchronization state. For instance, if synchronization is established n times in a row, the state is determined to be the frame synchronization established state. On the other hand, if the attempt of establishing synchronization n times in a row fails, the state is determined to be the loss of synchronization state. Then, the state transition processing unit 122*c* outputs a state notification signal indicating the determination result indicating whether the state is the synchronization established state or the loss of synchronization state.

The frame counter 123*c* receives, from the state transition processing unit 122*c*, synchronization establishment information indicating whether frame synchronization is established, and operates the counter for recognizing the LO-ODU frame. On the basis of the value, output by the frame counter 123*c*, overhead position information and BIP calculation range information are generated and output.

Figure 22:
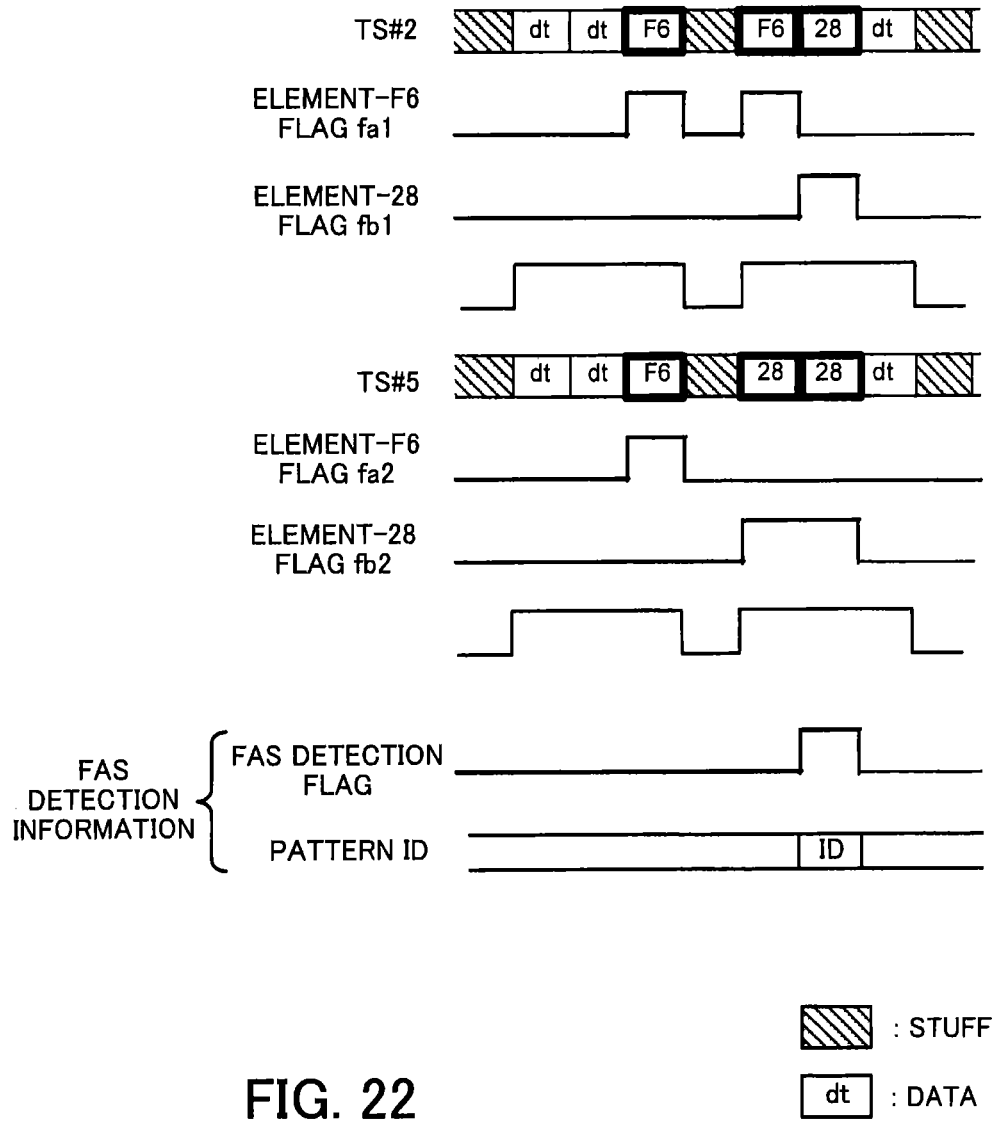
FIG. 22 illustrates FAS detection information.

FIG. 22 illustrates FAS detection information. The FAS pattern detection unit 121*c* generates, upon detecting a FAS, a FAS detection flag and a pattern ID (an ID that indicates whether the FAS is detected with the head thereof in the tributary slot #2 or in the tributary slot #5) as FAS detection information, and outputs the FAS detection information to the state transition processing unit 122*c*.

Figure 23:
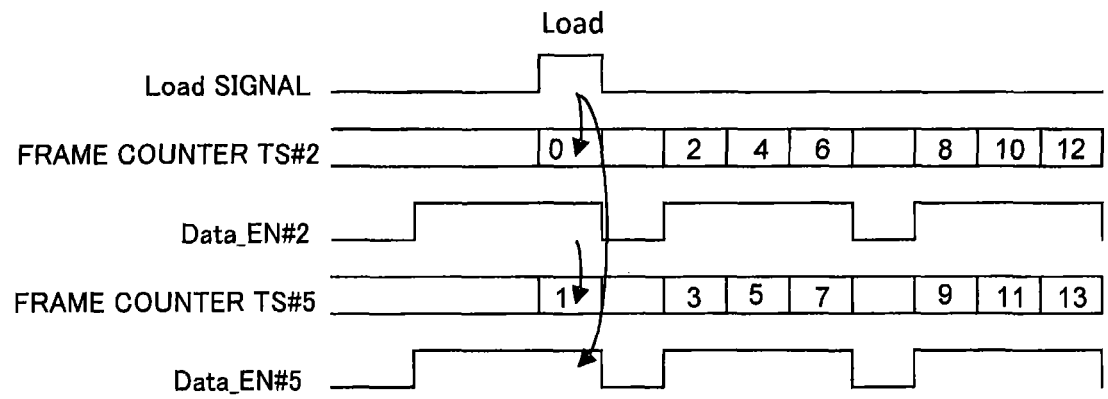
FIG. 23 illustrates operations of a frame counter.

FIG. 23 illustrates operations of the frame counter 123*c*. The state transition processing unit 122*c* provides synchronization protection and detects synchronization on the basis of the FAS detection flag and the pattern ID included in the FAS detection information. If synchronization is established, the state transition processing unit 122*c* outputs a load signal to the frame counter 123*c*.

The frame counter 123*c* having received the load signal performs initialization for phasing, and performs synchronization between the data and the counter. Then, the frame counter 123*c* specifies the overhead position and the BIP calculation range, and outputs the overhead position and the BIP calculation range as control information.

Figure 24:
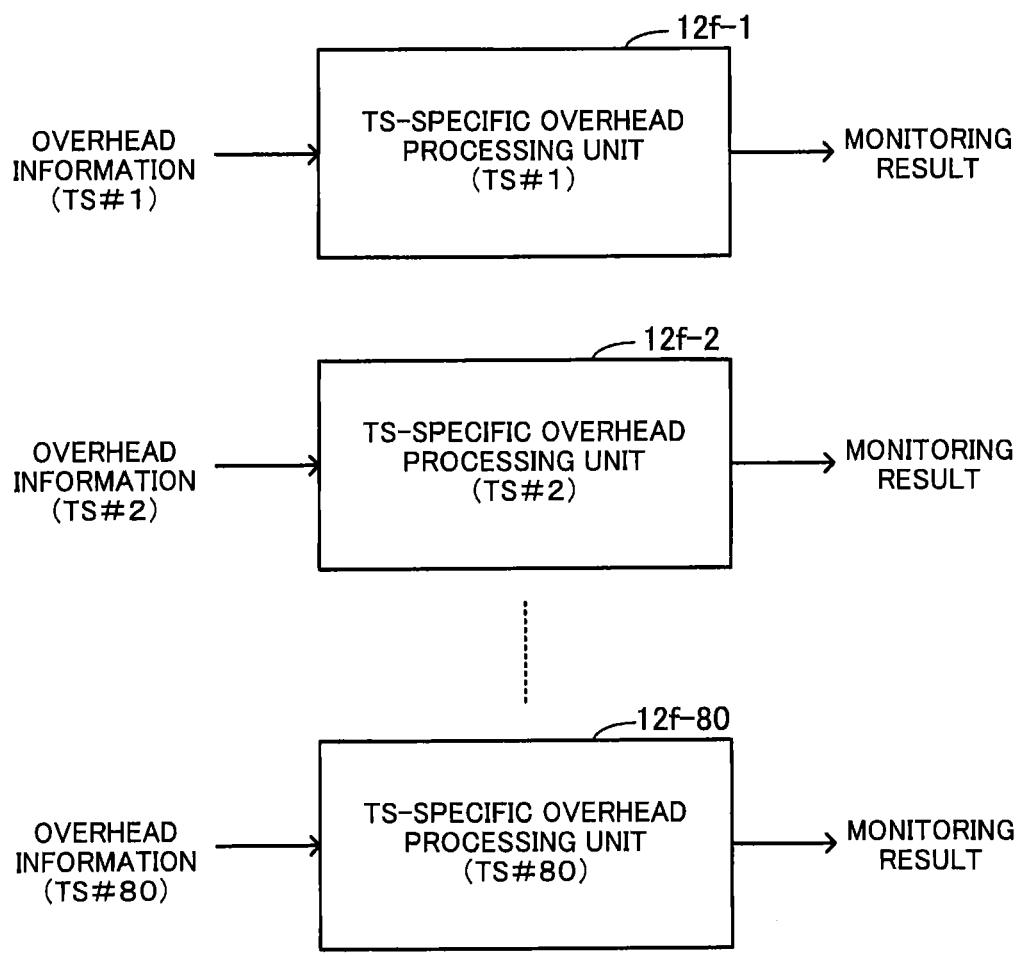
FIG. 24 illustrates operations of TS-specific overhead processing units.

FIG. 24 illustrates operations of TS-specific overhead processing units 12*f*-1 through 12*f*-80. The LO-ODU overhead processing unit 12*f* includes the TS-specific overhead processing units 12*f*-1 through 12*f*-80. The TS-specific overhead processing units 12*f*-1 through 12*f*-80 collect the overhead information of the respective tributary slots that are output from the LO-ODU overhead extraction units 12d-1 through 12d-80 so as to perform monitoring, and output the monitoring results.

Figure 25:
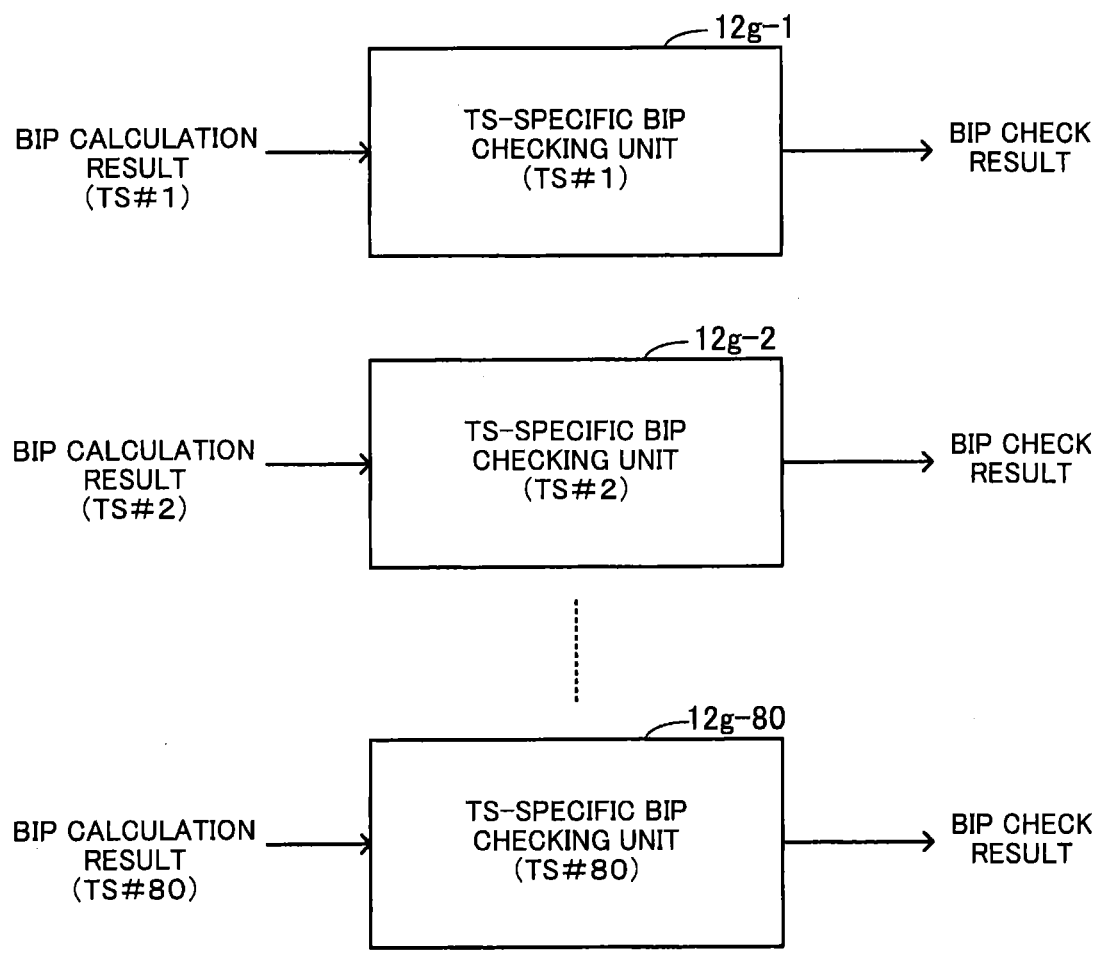
FIG. 25 illustrates operations of TS-specific BIP checking units.

FIG. 25 illustrates operations of TS-specific BIP checking units 12g-1 through 12g-80. The BIP checking unit 12g includes the TS-specific BIP checking units 12g-1 through 12g-80. The TS-specific BIP checking units 12g-1 through 12g-80 collect the BIP calculation results of the respective tributary slots that are transmitted from the BIP calculation units 12e-1 through 12e-80, aggregate the BIP calculation results into a single result as a BIP calculation result in units of LO-ODUs, and process the result so as to output the BIP check result.

As described above, according to the exemplary embodiments, head position detection is performed with respect to LO-ODU frames that are discretely mapped to an HO-ODU frame without shaping the data stream for each of the types of LO-ODUs, and thus the LO-ODU frames are recognized.

Accordingly, a circuit configuration in which a plurality of parallel control systems for detecting frame synchronization on a per LO-ODU type basis does not need to be provided, and frame synchronization is efficiently detected with respect to an arbitrary type of LO-ODU. This allows the apparatus size to be reduced.

Further, since extraction of the overhead and BIP processing are performed while maintaining the LO-ODUs in a state of being divided into the tributary slots, it is possible to easily perform cross-connect in units of tributary slots and perform multiplexing again without dividing the LO-ODUs back into tributary slots. This allows the configuration of the apparatus to be simplified.

Although frame synchronization detection control in the case where LO-ODUs are mapped to HO-ODU4 having 80 tributary slots has been illustrated in the above, the HO-ODU to which LO-ODUs are to be mapped is not limited to HO-ODU4. The HO-ODUs to which LO-ODUs are to be mapped may be any of HO-ODU3 (32 tributary slots), HO-ODU2 (8 tributary slots), and HO-ODU1 (2 tributary slots). Although the number of tributary slots differs, the same basic configuration of the apparatus is the same.

According to the communication system, the frame synchronization detection apparatus, and the frame synchronization method described above, it is possible to reduce the apparatus size.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication system comprising:
a frame transmitting apparatus that includes:
a frame transmitter that divides a payload area of an upper-layer frame into a plurality of slots, maps a lower-layer frame to one or more of the slots, and transmits the upper-layer frame with connection information included, the connection information indicating which one or more of the slots the lower-layer frame of a same type is mapped to; and
a frame receiving apparatus that includes:
a frame receiver that receives the upper-layer frame; and
a frame synchronization detector that detects frame synchronization of the lower-layer frame;
wherein the frame synchronization detector identifies, as one or more allocated slots, the one or more slots to which the lower-layer frame of the same type is mapped, on the basis of the connection information, detects the frame synchronization by identifying a frame head signal of the lower-layer frame of the same type that is mapped to the one or more allocated slots, and recognizes the lower-layer frame that is discretely mapped to the upper-layer frame with nonshaping data stream for each of types of the lower-layer frames;
wherein the frame synchronization detector detects frame head signal elements forming the frame head signal so as to generate flags of the frame head signal elements, and aggregates the flags of the frame head signal elements mapped to the one or more allocated slots so as to identify the frame head signal of the lower-layer frame of the same type; and
wherein the frame synchronization detector detects an appearance pattern on the basis of the flags and the connection information, provides synchronization protection on the basis of the appearance pattern and outputs a state transition between a frame synchronization established state and a loss of synchronization state.

2. A frame synchronization detection apparatus comprising:
a frame receiver that receives an upper-layer frame including a payload area divided into a plurality of slots, one or more of which a lower-layer frame is mapped to; and
a frame synchronization detector that detects frame synchronization of the lower-layer frame;
wherein the frame receiver extracts, from the received upper-layer frame, connection information that indicates which one or more of the slots the lower-layer frame of a same type is mapped;
wherein the frame synchronization detector identifies, as one or more allocated slots, the one or more slots to which the lower-layer frame of the same type is mapped, on the basis of the connection information, detects the frame synchronization by identifying a frame head signal of the lower-layer frame of the same type that is mapped to the one or more allocated slots, and recognizes the lower-layer frame that is discretely mapped to the upper-layer frame with non-shaping data stream for each of types of the lower-layer frames;
wherein the frame synchronization detector detects frame head signal elements forming the frame head signal so as to generate flags of the frame head signal elements, and aggregates the flags of the frame head signal elements mapped to the one or more allocated slots so as to identify the frame head signal of the lower-layer frame of the same type; and
wherein the frame synchronization detector detects an appearance pattern on the basis of the flags and the connection information, provides synchronization protection on the basis of the appearance pattern and outputs a state transition between a frame synchronization established state and a loss of synchronization state.

3. A frame synchronization detection method comprising:
receiving an upper-layer frame that includes a payload area divided into a plurality of slots, one or more of which a lower-layer frame is mapped to;

extracting, from the received upper-layer frame, connection information that indicates which one or more of the slots the lower-layer frame of a same type is mapped;

identifying, as one or more allocated slots, the one or more slots to which the lower-layer frame of the same type is mapped, on the basis of the connection information;

detecting frame synchronization by identifying a frame head signal of the lower-layer frame of the same type that is mapped to the one or more allocated slots, and recognizing the lower-layer frame that is discretely mapped to the upper-layer frame with non-shaping data stream for each of types of the lower-layer frames;

detecting frame head signal elements forming the frame head signal so as to generate flags of the frame head signal elements;

aggregating the flags of the frame head signal elements mapped to the one or more allocated slots so as to identify the frame head signal of the lower-layer frame of the same type; and detecting an appearance pattern on the basis of the flags and the connection information, providing synchronization protection on the basis of the appearance pattern and outputting a state transition between a frame synchronization established state and a loss of synchronization state.

* * * * *